US009569637B2

(12) United States Patent
Bar-On et al.

(10) Patent No.: US 9,569,637 B2
(45) Date of Patent: *Feb. 14, 2017

(54) ENHANCED PRIVACY FOR PROVISION OF COMPUTER VISION

(71) Applicant: Intel Corporation, Santa Clara, CA (US)

(72) Inventors: David Bar-On, Givat Ella (IL); Geoffrey Strongin, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,665

(22) Filed: Nov. 11, 2015

(65) Prior Publication Data

US 2016/0078249 A1    Mar. 17, 2016

Related U.S. Application Data

(60) Continuation of application No. 14/518,962, filed on Oct. 20, 2014, now Pat. No. 9,213,863, which is a division of application No. 13/624,703, filed on Sep. 21, 2012, now Pat. No. 8,914,894.

(51) Int. Cl.
*G06F 7/04* (2006.01)
*G06F 21/62* (2013.01)
*G06F 21/83* (2013.01)

(52) U.S. Cl.
CPC .......... *G06F 21/6245* (2013.01); *G06F 21/83* (2013.01)

(58) Field of Classification Search
CPC .................... G06F 21/6245; G06F 21/83

USPC .................................................. 726/26
See application file for complete search history.

(56) References Cited

U.S. PATENT DOCUMENTS

| 6,744,461 | B1 * | 6/2004 | Wada ............... H04N 7/18 348/143 |
| 7,227,567 | B1 * | 6/2007 | Beck ............... H04N 7/147 348/14.01 |
| 7,570,283 | B2 | 8/2009 | Sato et al. |
| 7,814,061 | B2 * | 10/2010 | Kuberka ......... G06F 17/3028 382/115 |
| 7,911,513 | B2 * | 3/2011 | Garrison .......... H04N 7/14 348/239 |
| 8,086,071 | B2 * | 12/2011 | Chen ............... G06T 11/001 345/421 |

(Continued)

*Primary Examiner* — Samson Lemma
(74) *Attorney, Agent, or Firm* — Schwabe, Williamson & Wyatt, P.C.

(57) ABSTRACT

Methods, apparatuses and storage medium associated with providing enhanced privacy during usage of computer vision are disclosed. In embodiments, an apparatus may include one or more privacy indicators to indicate one or more privacy conditions of the apparatus in association with provision of computer vision on the apparatus. The apparatus may further include a privacy engine coupled with the one or more privacy indicators, and configured to preprocess images from an image source of the apparatus associated with the provision of computer vision to the apparatus, to increase privacy for a user of the apparatus, and to control the one or more privacy indicators. In embodiments, the apparatus may include means for blanking out one or more pixels with depth values identified as greater than a threshold. Other embodiments may be described and claimed.

25 Claims, 5 Drawing Sheets

(56) References Cited

U.S. PATENT DOCUMENTS

| | | | | |
|---|---|---|---|---|
| 8,159,519 | B2* | 4/2012 | Kurtz | H04N 7/147 348/14.01 |
| 8,212,872 | B2 | 7/2012 | Sablak | |
| 8,723,796 | B2* | 5/2014 | Ptucha | G06F 3/017 345/158 |
| 2007/0201694 | A1 | 8/2007 | Bolle et al. | |
| 2008/0259154 | A1* | 10/2008 | Garrison | H04N 7/14 348/14.01 |
| 2011/0242345 | A1* | 10/2011 | O'Gorman | G06F 21/6263 348/222.1 |
| 2013/0094753 | A1* | 4/2013 | Voss | G06T 5/002 382/154 |
| 2014/0139423 | A1 | 5/2014 | Hsieh et al. | |

* cited by examiner

Non-transitory computer-readable storage medium
502

Programming Instructions 504
configured to cause a device, in response to execution of the programming instructions, to practice (aspects of) embodiments of the method of Figure 2.

Figure 5

ENHANCED PRIVACY FOR PROVISION OF COMPUTER VISION

RELATED APPLICATION

This application is a continuation application of U.S. patent application Ser. No. 14/518,962, entitled ENHANCED PRIVACY FOR PROVISION OF COMPUTER VISION, filed Oct. 20, 2014, which is a divisional application of U.S. patent application Ser. No. 13/624,703, entitled ENHANCED PRIVACY FOR PROVISION OF COMPUTER VISION, filed Sep. 21, 2012, now U.S. Pat. No. 8,914,894, and claims priority to the Ser. Nos. 14/518,962 and 13/624,703 applications. The Specifications of Ser. Nos. 14/518,962 and 13/624,703 are hereby fully incorporated by reference.

TECHNICAL FIELD

This application relates to the technical field of data processing, more specifically to methods, apparatuses and storage medium associated with enhanced privacy for provision of computer vision.

TECHNICAL FIELD

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuit, computing and related technologies, computer vision, e.g., gesture recognition, is increasingly being employed to enhance user computing experience. Computer vision often includes the capturing and processing of images. Gesture recognition often includes the capturing and processing of images of the user, and/or his/her surroundings. Malicious software can connect to the imaging devices, such as cameras, used to capture the images, or intercept image outputs of the imaging devices, and make unauthorized transmission of the images. Thus, user privacy may be violated or compromised. Increasingly, users are concerned.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Methods, apparatuses and storage medium associated with providing enhanced privacy for provision of computer vision are disclosed. In embodiments, an apparatus may include one or more privacy indicators to indicate one or more privacy conditions of the apparatus in association with provision of computer vision. The apparatus may further include a privacy engine coupled with the one or more privacy indicators, and configured to pre-process images from an image source of the apparatus associated with provision of computer vision to the apparatus, to increase privacy for a user of the apparatus, and to control the one or more privacy indicators.

In embodiments, an apparatus may include means for receiving an image from an image source associated with provision of computer vision, the image having a plurality of pixels, calculating depth values for the pixels, and outputting the depth values as a depth value map of the image. The apparatus may further include means for receiving the depth value map, processing the depth value map to identify depth values that are greater than a threshold, and on determination that one or more depth values are greater that the threshold, outputting in response one or more disable indicators for use to blank out one or more pixels corresponding to the one or more depth values identified as greater than the threshold, to provide enhanced privacy for the provision of computer vision.

In embodiments, the apparatus may further include means for receiving the image and the one or more disable indicators, and applying the one or more disable indicators to the image to blank out the pixels with depth values greater than the threshold, to provide enhanced privacy for provision of computer vision. In embodiments, the apparatus may further include means for receiving the depth value map and the one or more disable indicators, and applying the one or more disable indicators to the depth value map to blank out the depth values that are greater than the threshold.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
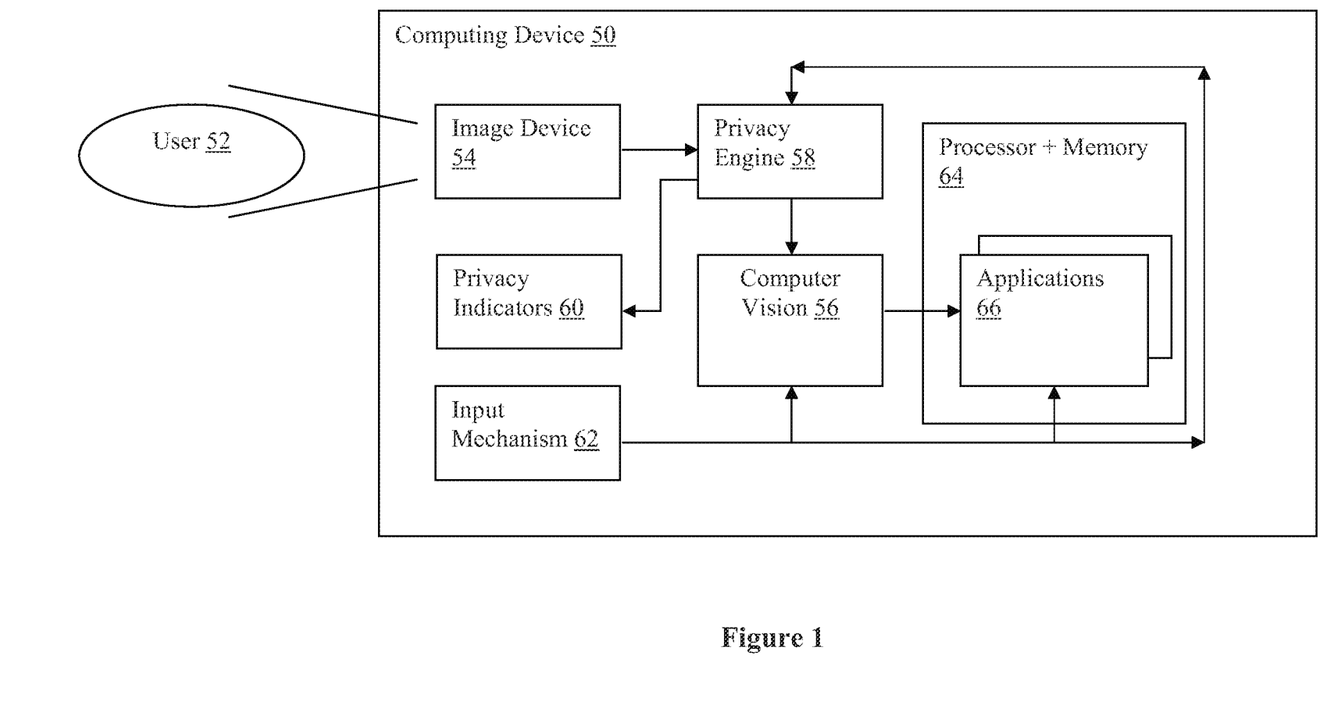
FIG. 1 illustrates an overview of a computing device with enhanced privacy for usage of computer vision.

FIG. 1 illustrates a computing device with enhanced privacy for provision of computer vision, in accordance with embodiments of the present disclosure. As illustrated, in embodiments, computing device 50 may include imaging device 54 and computer vision engine 56 configured to cooperate with each other to provide computer vision to computing device 50, e.g., to applications 66 of computing device 50. In embodiments, imaging device 54 and computer vision engine 56 may be configured to provide computer vision that includes, but are not limited to, recognition of gestures made by users 52. Such gestures may, for example, be interpreted by applications 66 as corresponding user commands for applications 66. Resultantly, images captured by imaging device 54 for computer vision engine 56 may often include full or partial image of the user and/or the user's surroundings.

In embodiments, computing device 50 may further include privacy engine 58 configured to provide enhanced privacy to user 52 when computer vision engine 56 is in use by computing device 50. As illustrated, privacy engine 58 may be disposed in between imaging device 54 and computer vision engine 56, and configured to pre-process images outputted by imaging device 54, before the images are provided to computer vision engine 56, to effectuate the desired increase privacy. In embodiments, as will be described in more detail below, privacy engine 58 may be configured to blank out pixels in the images with depth value in excess of a threshold, e.g., a threshold denoting a limit of a near field of the image where analysis, e.g., gesture recognition, is performed.

In embodiments, computing device 50 may further include one or more privacy indicators 60 to indicate one or more privacy conditions of computing device 50 in association with provision of computer vision on computing device 50. One or more privacy indicators 60 may include a visual indicator, e.g., a light emitting diode (LED), to visually indicate to user 52 that computer vision is in use, that is, images are being taken of users 52 and analyzed. One or more privacy indicators 60 may further include another visual indicator, e.g., another LED, to visually indicate to user 52 that no object is detected in the images being taken and analyzed. As shown, one or more privacy indicators 60 may be coupled with, and controlled by privacy engine 58.

In embodiments, computing device 50 may include processor and memory 64 configured to execute applications 66. While for ease of understanding, computer vision engine 56, privacy engine 58 and processor and memory 64 are illustrated as separate blocks, in embodiments, privacy engine 58 and/or computer vision engine 56 may share common processor and/or memory resources with processor and memory 64 hosting applications 66, or combined.

In embodiments, computing device 50 may further include input mechanism 62 configured to facilitate user 52 to provide various user inputs to computer vision engine 56, privacy engine 58 and/or applications 66. In particular, input mechanism 62 may be configured to facilitate user 52 to configure the threshold to be used by privacy engine 58.

Imaging device 54, computer vision engine 56, input mechanism 62 and processor and memory 64 are intended to represent a broad range of these elements known in the art. For example, imaging devices 54 may be any one of a number of cameras known in the art. Computer vision engine 56 may include any frame grabber or video input device (or USB camera adapter) as known in the art. Input mechanism 62 may include hard or soft keys. Processor and memory 64 may include single or multi-core processors, volatile or non-volatile memory, and so forth. Accordingly, computing device 50, except for privacy engine 58 and privacy indicators 60, may be any one of a number of computing devices known in the art including, but are not limited to, personal digital assistants (PDA), media players, smartphones, ultrabooks, computing tablets, laptop computers, desktop computers, set-top boxes, game consoles, smart TVs, and so forth.

Figure 2:
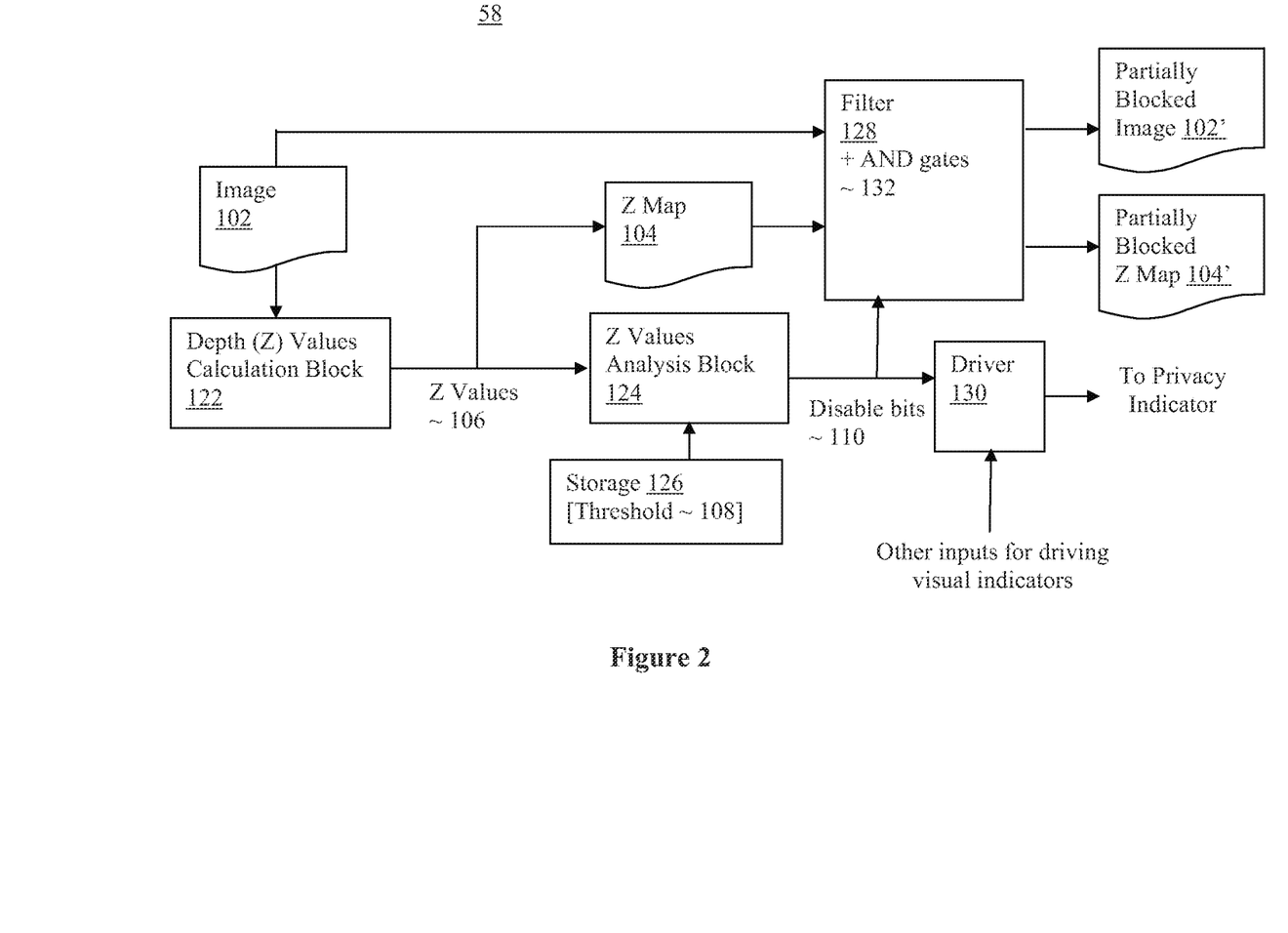
FIG. 2 illustrates the privacy engine of FIG. 1 in further detail.

FIG. 2 illustrates the privacy engine of FIG. 1 in further detail, in accordance with embodiments of the present disclosure. As illustrated, for the embodiments, privacy engine 58 may include depth (Z) values calculation block 122, Z values analysis block 124, storage 126, and filter 128 coupled with each other as shown. Elements 122-128 may be configured to cooperate with each other to selectively blank out pixels of an image from an image source associated with provision of computer vision (e.g., imaging device 54 of FIG. 1) to provide enhanced privacy during usage of computer vision. For example, the elements 122-128 may cooperate to blank out pixels of an image from a camera associated with gesture recognition, that are considered to be beyond a near field in the image, analyzed for gesture recognition. Accordingly, enhanced privacy may be provided for the gesture recognition operations, even if the image is disseminated without authorization.

In embodiments, Z values calculation block 122 may be configured to receive an image 102 from imaging device 54. Image 102 may include a number of pixels with corresponding pixel values. Further, Z values calculation block 122 may be configured to process the received image, and output, in response, Z values 106 for the pixels.

In embodiments, Z values analysis block 124 may be configured to receive Z values 106 from Z values calculation block 122, and a threshold 108 from storage 126, and output, in response, disable bits 110, e.g., in the form of disable signals, for all Z values 106 that are in excess of threshold 108. Disable bits 110 may be used to blank out the corresponding pixels in image 102 with Z values greater than the threshold.

In embodiments, storage 126 may be any one of a number of magnetic, optical or solid state storage, e.g., static or dynamic random memory. Threshold 108 may be associated with defining the limit of the near field of image 102 for an analysis, e.g., gesture recognition. For example, such threshold 108 may be set to a value in the range of 0 to 40 cm (from imaging device 54).

In embodiments, filter 128 may be configured to receive image 102 and disable bits 110, and apply the disable bits 110 to the corresponding pixels to blank out the pixels of image 102 with Z values 106 greater than threshold 108, before making image 102 available, e.g., for gesture recognition analysis. In other words, image 102 is only made available to computer vision engine 56 or other usage, in the form of partially blocked image 102'.

In embodiments, Z values 106 may form a Z map 104 that may be available for other usage. For these embodiments, filter 128 may be further configured to also receive Z map 104, and apply the disable bits 110 to blank out the Z values 106 that are greater than threshold 108, before making Z map 104 available for other usage. In other words, Z map 104 is made available only in the form of partially blocked Z map 104'.

In embodiments where the computing device hosting privacy engine 58 include visual indicators, e.g., LED, to provide one or more visual indications about one or more privacy conditions, driver 130 may be configured to enable one of the visual indicators to indicate that images are being taken and processed to provide computer vision, such as gesture recognition. In embodiments, driver 130 may be further configured to enable another visual indicator to indicate that privacy engine 58 is in operation to provide enhanced security. In particular, this visual indicator may be lit to a particular color, e.g., green, to indicate that the image is empty (e.g., no disable bits 110 are being outputted by Z value analysis block 124 and no objects in the near field). Thus, through the visual indicators, a user may be appraised of the privacy condition.

In embodiments, except for storage 126, privacy engine 58, in general, may otherwise be implemented in either hardware or software, or combination thereof. In various implementations, depth (Z) values calculation block 122 and Z values analysis block 124 may implemented, e.g., using programmable array logics (PAL). Filter 128 may include in number of AND gates 132 configured to perform the blanking operations. Driver 130 may be a one on circuit. In various software implementations, depth (Z) values calculation block 122, Z values analysis block 124, filter 128, and driver 130 may be a number of programming instructions, such as C, configured to cause a computing device to perform the described operations, in response to execution by one or more processors of the computing device.

Figure 3:
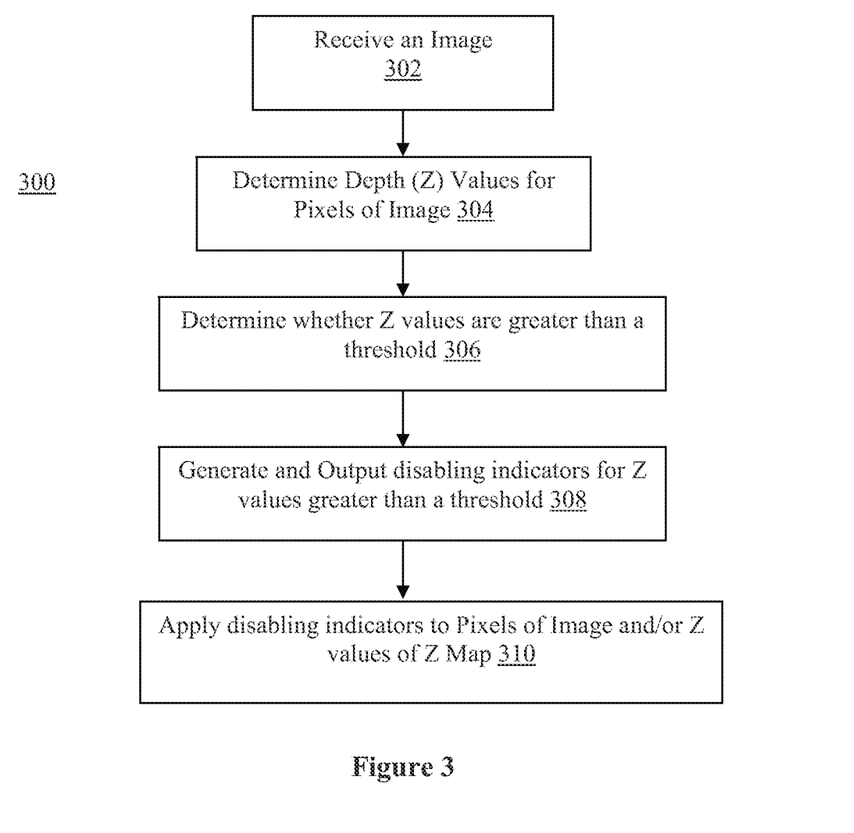
FIG. 3 illustrates a method for providing enhanced privacy for provision of computer vision.

FIG. 3 illustrates a process for providing enhanced privacy to a user while computer vision is used, in accordance with embodiments of the present disclosure. As shown, in embodiments, process 300 may start at block 302. At block 302, a digital image may be received from an image source associated with provision of computer vision. From block 302, process 300 may proceed to block 304. At block 304, a number of depth (Z) values for a number of corresponding pixels of the image may be digitally calculated.

From block 304, process 300 may proceed to block 306. At block 306, whether the depth values are greater than a threshold may be digitally determined. From block 306, process 300 may proceed to block 308. At block 308, disabling indicators, e.g., signals and/or bits, may be digitally generated for pixels with depth values determined to be in excess of the threshold.

From block 308, process 300 may proceed to block 310. At block 310, the disabling indicators may be applied to blank out the pixels of the image with depth values in excess of the threshold. Additionally, or alternatively, the disabling indicators may be applied to a depth value map formed with the depth values to blank out depth values in excess of the threshold.

Figure 4:
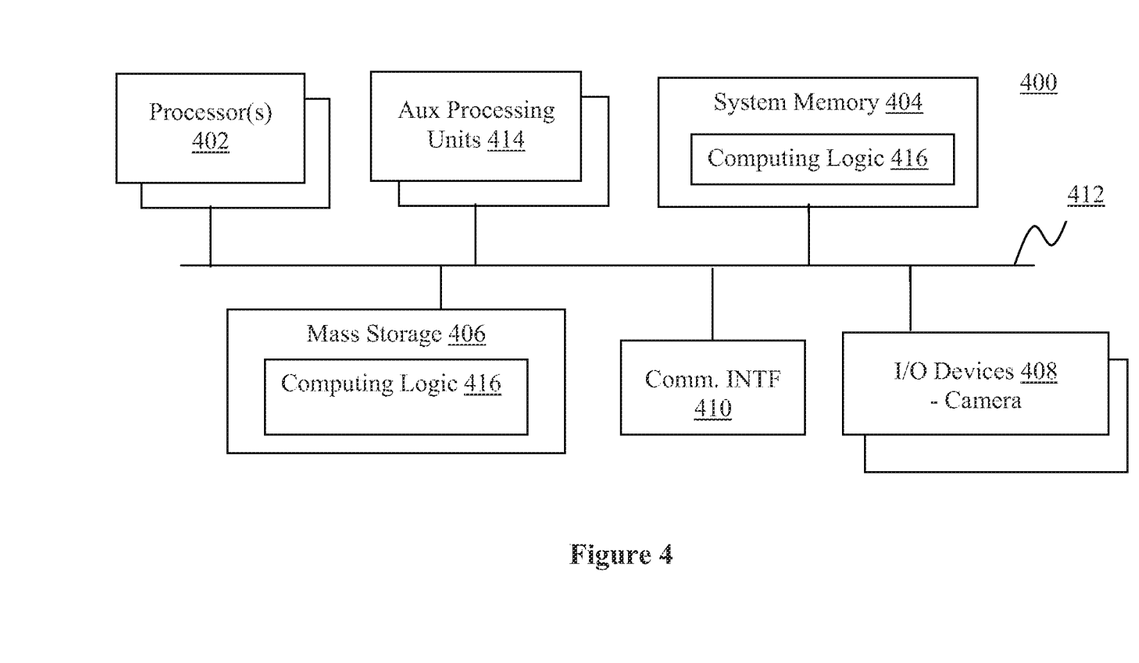
FIG. 4 illustrates an example computing device configured to provide enhanced privacy for provision of computer vision.

FIG. 4 illustrates an example computing device configured to enhance privacy for provision of computer vision, in accordance with various embodiments of the present disclosure. As shown, computing device 400 may include a number of processors or processor cores 402, co-processor(s) or auxiliary processing units 414, and system memory 404. In embodiments, co-processor(s) or auxiliary processing units 414 may include the earlier described computer vision engine 56 and/or privacy engine 58. For the purpose of this application, including the claims, the terms "processor" and "processor cores" may be considered synonymous, unless the context clearly requires otherwise. Additionally, computing device 400 may include mass storage devices 406 (such as diskette, hard drive, compact disc read only memory (CD-ROM) and so forth), input/output devices 408 (such as camera, visual indicators (such as LED), display, keyboard, cursor control and so forth), and communication interfaces 410 (such as network interface cards, modems and so forth). The elements may be coupled to each other via system bus 412, which may represent one or more buses. In the case of multiple buses, they may be bridged by one or more bus bridges (not shown).

System memory 404 and mass storage devices 406 may respectively include temporal or persistent copies of computing logic 416 implementing various applications 66, and aspects of privacy engine 58 and/or computer vision 56 that are implemented in software. Computing logic 416 may be implemented in assembler instructions supported by processor(s) of 402 and/or 414, or high-level languages, such as, C, that can be compiled into such supported instructions.

Except for auxiliary processing units 414 and/or computing logic 416 implementing privacy engine 58, the constitution of these elements 402-414 are known, and accordingly will not be further described.

The programming instructions implementing computing logic 416 may be installed on computing device 400 in the factory, or in the field, through, for example, a distribution medium (not shown), such as a compact disc (CD), or through communication interface 410 (from a distribution server (not shown)). That is, one or more distribution media having an implementation of privacy engine 58 may be employed to facilitate its distribution.

Figure 5:
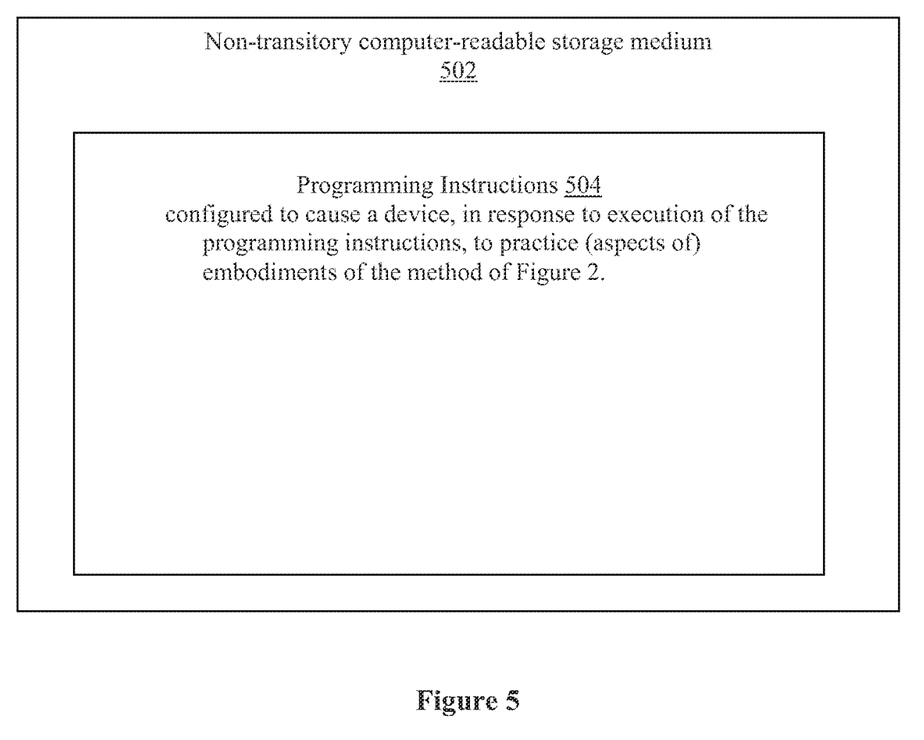
FIG. 5 illustrates an example non-transitory computer-readable storage medium having instructions configured to practice all or selected aspects of the method of FIG. 3; all arranged in accordance with embodiments of the present disclosure.

FIG. 5 illustrates an example non-transitory computer-readable storage medium having instructions configured to practice all or selected aspects of the process of FIG. 3; in accordance with various embodiments of the present disclosure. As illustrated, non-transitory computer-readable storage medium 502 may include a number of programming instructions 504. Programming instructions 504 may be configured to enable a device, e.g., computing device 400, in response to execution of the programming instructions, to perform various operations of the various flows of FIG. 3. In alternate embodiments, programming instructions 504 may be disposed on multiple non-transitory computer-readable storage media 502 instead.

Thus, embodiments disclosed include, but are not limited to a computing apparatus having one or more privacy indicators to visually indicate one or more privacy conditions of the computing apparatus in association with employment of computer vision by the computing apparatus; and a privacy engine coupled with the one or more privacy indicators, and configured to pre-process images from an image source of the computing apparatus associated with provision of computer vision to the computing apparatus, to increase privacy for a user of the computing apparatus in association with the employment of computer vision by the computing apparatus, and to control the one or more privacy indicators.

In embodiments, the privacy engine may include a depth value calculation block to receive the image from the image source, the image having a plurality of pixels, calculate depth values for the pixels, and output the depth values as a depth value map of the image; and a depth value analysis block coupled with the depth value calculation block to receive the depth value map, process the depth value map to identify depth values that are greater than a threshold, and on determination that one or more depth values are greater that the threshold, output in response one or more disable signals for use to blank out one or more pixels corresponding to the one or more depth values identified as greater than the threshold, to effectuate the increase in privacy.

In embodiments, the apparatus may further include a filter coupled with the depth value analysis block to receive the one or more disable signals, and apply the one or more disable signals to the image to blank out the pixels with depth values greater than the threshold, wherein the filter is to further receive the image. The depth values may form a depth value map, and the apparatus may further include a filter coupled with the depth value analysis block to receive the one or more disable signals, and apply the one or more disable signals to the depth value map to blank out the depth values that are greater than the threshold. The filter may be further coupled with the depth value calculation block to receive the depth value map.

In embodiments, the apparatus may further include the image source. The image source may include one or more cameras. In embodiments, the one or more privacy indicators may include a visual indicator, and the privacy engine may be configured to enable the visual indicator when images are being captured and used for provision of computer vision. The one or more privacy indicators may include a visual indicator, and the privacy engine may be configured to enable the visual indicator when images being captured and used for provision of computer vision are blank. The privacy engine may include a one shot circuit coupled with the visual indicator to drive the visual indicator.

In embodiments, the privacy engine may further include a storage medium coupled with the depth value analysis block to store the threshold and provide the threshold to the depth value analysis block, and the apparatus may further include a configuration mechanism coupled with the storage medium to facilitate configuration of the threshold. The apparatus may be a selected one of a smartphone, a computing tablet, an ultrabook, a laptop computer, a desktop computer, a set-top box, a smart TV or a game console.

In embodiments, a method may include calculating, digitally, a plurality of depth values for a plurality of corresponding pixels of an image from an image source associated with providing computer vision on a computing device; and determining, digitally, whether the depth values are greater than a threshold. The method may further include, on determination that one or more depth values are greater that the threshold, outputting in response one or more disable indicators for use to blank out one or more pixels corresponding to the one or more depth values identified as greater than the threshold, to provide enhanced privacy for the computer vision.

In embodiments, the method may further include applying, digitally, the one or more disable indicators to the image to blank out the one or more corresponding pixels. The depth values may form a depth value map, and the disable indicators may include disable bits, and the method may further include applying, digitally, the one or more disable bits to the depth value map to blank out the one or more depth values that are greater than the threshold.

In embodiments, the method may further include enabling a visual indicator, electronically, when no disable indicator is being outputted as a result of no depth value having been identified as greater than the threshold, and no object is detected among pixels with depth values that do not exceed the threshold. The method may further include storing, digitally, the threshold and providing the threshold for said determining, and/or accepting, digitally, a setting for the threshold.

In embodiments, at least one non-transitory computer-readable storage medium may include a plurality of instructions. The instructions, in response to execution of the instructions by a computing apparatus, may enable the computing apparatus to calculate a plurality of depth values for a plurality of corresponding pixels of an image from an image source associated with provision of computer vision on the computing apparatus, determine whether the depth values are greater than a threshold, and on determination that one or more depth values are greater that the threshold, output in response one or more disable indicators for use to blank out one or more pixels corresponding to the one or more depth values identified as greater than the threshold, to provide enhanced privacy for the computer vision.

In embodiments, the instructions, in response to execution of the instructions by the computing apparatus, may further enable the computing apparatus to apply the one or more disable indicators to the image to blank out the one or more corresponding pixels. The depth values may form a depth value map, and the disable indicators may include disable bits. The instructions, in response to execution of the instructions by the computing apparatus, may further enable the computing apparatus to apply the one or more disable bits to the depth value map to blank out the one or more depth values that are greater than the threshold.

In embodiments, the instructions, in response to execution of the instructions by the computing apparatus, may further enable the computing apparatus to enable a visual indicator, when no disable indicator is being outputted as a result of no depth value having been identified as greater than the threshold, and no object is detected among pixels with depth values that are less than the threshold. The instructions, in response to execution of the instructions by the computing apparatus, may further enable the computing apparatus to store the threshold and provide the threshold for said determine. The instructions, in response to execution of the instructions by the computing apparatus, may further enable the computing apparatus to accept a setting for the threshold.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims.

What is claimed is:

1. An apparatus for computing, comprising:
   one or more hardware processors;
   a privacy engine to be operated by the one or more hardware processors to preprocess images from an image source associated with the computer apparatus for user gesture recognition by the computer apparatus, to increase privacy for a user of the computer apparatus in association with employment of computer vision by the computer apparatus for user gesture recognition, wherein the privacy engine is to modify the images, zero out pixels of the images beyond a near field in the images analyzed for user gesture recognition to blank out those pixels of the images not analyzed for user gesture recognition; and
   a computer vision engine to be operated by the one or more hardware processors to recognize user gestures, wherein the computer vision engine is to analyze the near field in the modified images for user gestures.

2. The apparatus of claim 1, wherein the privacy engine comprises:
   a depth value calculation block to receive the images from the image source, each image having a plurality of pixels, calculate depth values for the pixels of each image, and output the depth values of each image as a depth value map for the image; and a depth value analysis block coupled with the depth value calculation block to receive the depth value maps, process each depth value map to identify depth values that are greater than a threshold of the near field, and on determination that one or more depth values are greater that the threshold, output in response one or more disable signals for use to zero out one or more pixels of the corresponding image, corresponding to the one or more depth values identified as greater than the threshold, to blank out the one or more pixels.

3. The apparatus of claim 2, further comprising a filter coupled with the depth value analysis block to receive the one or more disable signals, and apply the one or more disable signals to an image to zero out the pixels of the image with depth values greater than the threshold to blank out those pixels, wherein the filter is to further receive the image.

4. The apparatus of claim 2, wherein the depth values form a depth value map, and the apparatus further comprises a filter coupled with the depth value analysis block to receive the one or more disable signals, and apply the one or more disable signals to the depth value map of an image to zero out the depth values that are greater than the threshold, wherein the filter is further coupled with the depth value calculation block to receive the depth value map of the image.

5. The apparatus of claim 1, further comprising the image source, wherein the image source includes one or more cameras.

6. The apparatus of claim 1, further comprising: one or more physical privacy indicators to visually indicate one or more privacy conditions of the computer apparatus in association with employment of computer vision by the computer apparatus for user gesture recognition.

7. The apparatus of claim 6, further comprising a one shot circuit coupled with a visual indicator to drive the visual indicator.

8. The apparatus of claim 2, wherein the privacy engine further comprises a storage medium coupled with the depth value analysis block to store the threshold and provide the threshold to the depth value analysis block, and the apparatus further comprises a configuration mechanism coupled with the storage medium to facilitate configuration of the threshold.

9. The apparatus of claim 1, wherein the apparatus is a selected one of a smartphone, a computer tablet, an ultrabook, a laptop computer, a desktop computer, a set-top box, a smart TV or a game console.

10. A method for computing, comprising:
preprocessing, by a computing device, a plurality of images from an image source associated with the computing device for user gesture recognition by the computing device, to increase privacy for a user of the computing device in association with employment of computer vision by the computing device for user gesture recognition, wherein preprocessing comprises modifying the images, zeroing out pixels of the images beyond a near field in the images analyzed for user gesture recognition to blank out those pixels; and
analyzing, by the computing device, the modified images to recognize user gestures, wherein analyzing comprises analyzing the near field in the modified images for user gestures.

11. The method of claim 10, wherein preprocessing comprises:
calculating a plurality of depth values for a plurality of pixels of the images;

determining whether the depth values are greater than a threshold of the near field; and
on determination that one or more depth values of an image are greater that the threshold, outputting in response one or more disable indicators for use to zero out one or more pixels corresponding to the one or more depth values identified as greater than the threshold, to blank out the one or more pixels.

12. The method of claim 11, wherein preprocessing further comprises applying the one or more disable indicators to the image to zero out the one or more corresponding pixels to blank out the one or more corresponding pixels.

13. The method of claim 12, wherein the depth values form a depth value map, and the disable indicators comprise disable bits, and wherein preprocessing further comprises applying the disable bits to the depth value map to zero out the one or more depth values that are greater than the threshold to blank out the one or more depth values.

14. The method of claim 11, wherein the depth values form a depth value map, and preprocessing further comprises applying the one or more disable indicators to an image map to zero out the one or more depth values that are greater than the threshold.

15. The method of claim 11, further comprising enabling, by the computing device, a visual indicator when no disable indicator is being outputted as a result of no depth value having been identified as greater than the threshold, and no object is detected among pixels with depth values that do not exceed the threshold.

16. The method of claim 11, further comprising storing, by the computing device, the threshold of the near field, and providing the threshold for said determining.

17. The method of claim 16, further comprising accepting, by the computing device, a setting for the threshold of the near field.

18. At least one non-transitory computer-readable storage medium comprising a plurality of instructions, wherein the instructions, in response to execution of the instructions by a computer apparatus, cause the computer apparatus to:
preprocess a plurality of images from an image source associated with the computer apparatus for user gesture recognition by the computer apparatus, to increase privacy for a user of the computer apparatus in association with employment of computer vision by the computer apparatus for user gesture recognition, wherein preprocessing comprises modification of the images, zero out pixels of the images beyond a near field in the images analyzed for user gesture recognition to blank out those pixels; and
analyze the modified images to recognize user gestures, wherein analyze comprises analyze the near field in the modified images for user gestures.

19. The computer-readable storage medium of claim 18, wherein to preprocess comprises to calculate a plurality of depth values for a plurality of corresponding pixels of the images, determine whether the depth values of an image are greater than a threshold of a near field analyzed for user gestures, and on determination that one or more depth values of the image are greater that the threshold, output in response one or more disable indicators for use to zero out one or more pixels of the image corresponding to the one or more depth values identified as greater than the threshold, to blank out the one or more pixels.

20. The computer-readable storage medium of claim 19, wherein to preprocess further comprises to apply the one or more disable indicators to the image to zero out the one or more corresponding pixels to blank out the one or more pixels.

21. The computer-readable storage medium of claim 19, wherein the depth values form a depth value map, and the disable indicators comprise disable bits, and wherein to preprocess further comprises to apply the disable bits to the depth value map to zero out the one or more depth values that are greater than the threshold.

22. The computer-readable storage medium of claim 19, wherein the depth values form a depth value map, and wherein to preprocess further comprises to apply the one or more disable indicators to the depth value map to blank out the one or more depth values that are greater than the threshold.

23. The computer-readable storage medium of claim 19, wherein the computer apparatus is further caused to enable a visual indicator, when no disable indicator is being outputted as a result of no depth value having been identified as greater than the threshold, and no object is detected among pixels with depth values that are less than the threshold.

24. The computer-readable storage medium of claim 19, wherein the computer apparatus is further caused to store the threshold of the near field and provide the threshold for said determine.

25. The computer-readable storage medium of claim 19, wherein the computer apparatus is further caused to accept a setting for the threshold.

* * * * *